United States Patent [19]
Kahn

[11] Patent Number: 4,475,789
[45] Date of Patent: Oct. 9, 1984

[54] OPTICAL FIBER POWER TAP

[75] Inventor: David A. Kahn, Nepean, Canada

[73] Assignee: Canadian Patents & Development Limited, Ottawa, Canada

[21] Appl. No.: 319,197

[22] Filed: Nov. 9, 1981

[51] Int. Cl.³ .................. G02B 5/172; G02B 7/26
[52] U.S. Cl. ................... 350/96.15; 350/96.21
[58] Field of Search .......... 350/96.15, 96.20, 96.21, 350/96.31

[56] References Cited

U.S. PATENT DOCUMENTS

| | | | |
|---|---|---|---|
| 3,628,036 | 12/1971 | Humphrey | 350/96.21 X |
| 3,777,149 | 12/1973 | Marcatili | 350/96.15 X |
| 4,053,764 | 10/1977 | Sierak et al. | 250/227 |
| 4,076,375 | 2/1978 | Muska et al. | 350/96.15 |
| 4,125,768 | 11/1978 | Jackson et al. | 250/227 |
| 4,169,656 | 10/1979 | Hodge | 350/96.15 |
| 4,188,087 | 2/1980 | D'Auria et al. | 350/96.20 |
| 4,201,447 | 5/1980 | Thompson et al. | 350/96.31 |
| 4,229,067 | 10/1980 | Love | 350/96.15 |

Primary Examiner—William L. Sikes
Assistant Examiner—Frank González
Attorney, Agent, or Firm—Edward Rymek

[57] ABSTRACT

At a fiberoptic tap used for monitoring purposes, one fiber, having a certain mode volume is spliced to a second fiber having a relatively lower mode volume. Consequently, in passing from the first fiber to a second fiber, some light is radiated away from the splice. This radiated light is directed to a photodetector. The tap is particularly advantageous for transmitter power monitoring since the radiated optical power is superfluous to that light which is capable of transmission by the line fiber.

13 Claims, 2 Drawing Figures

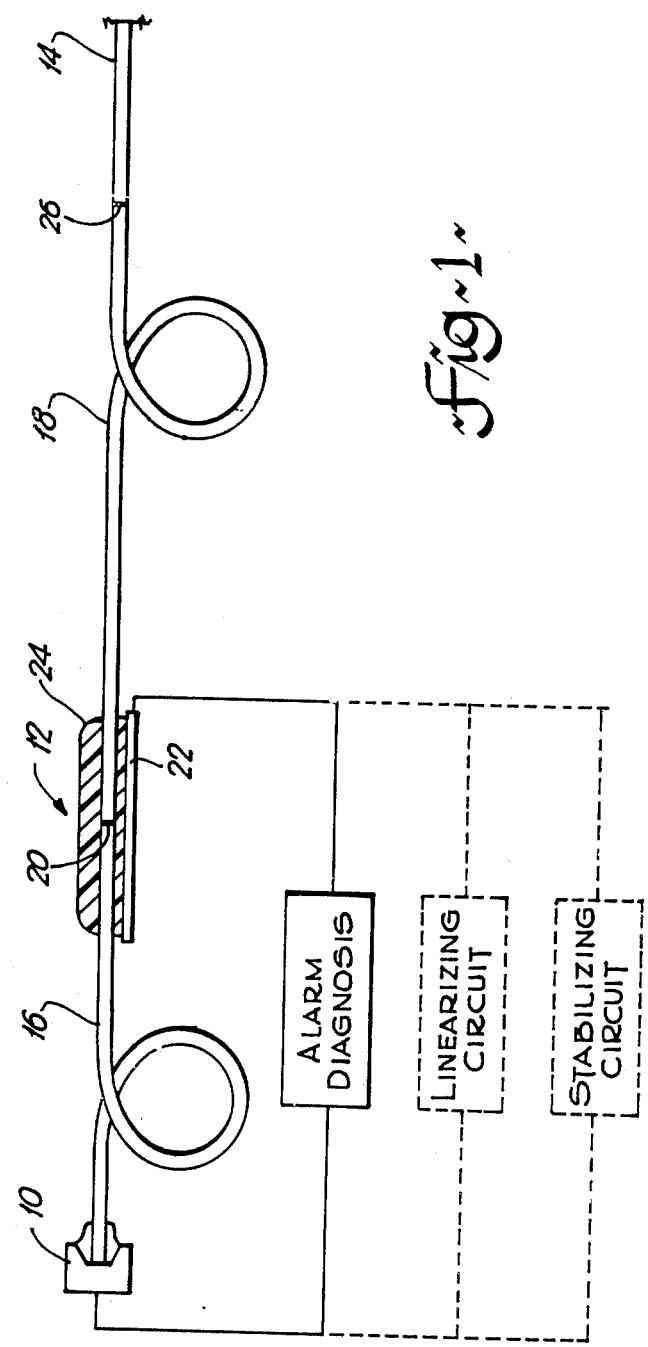

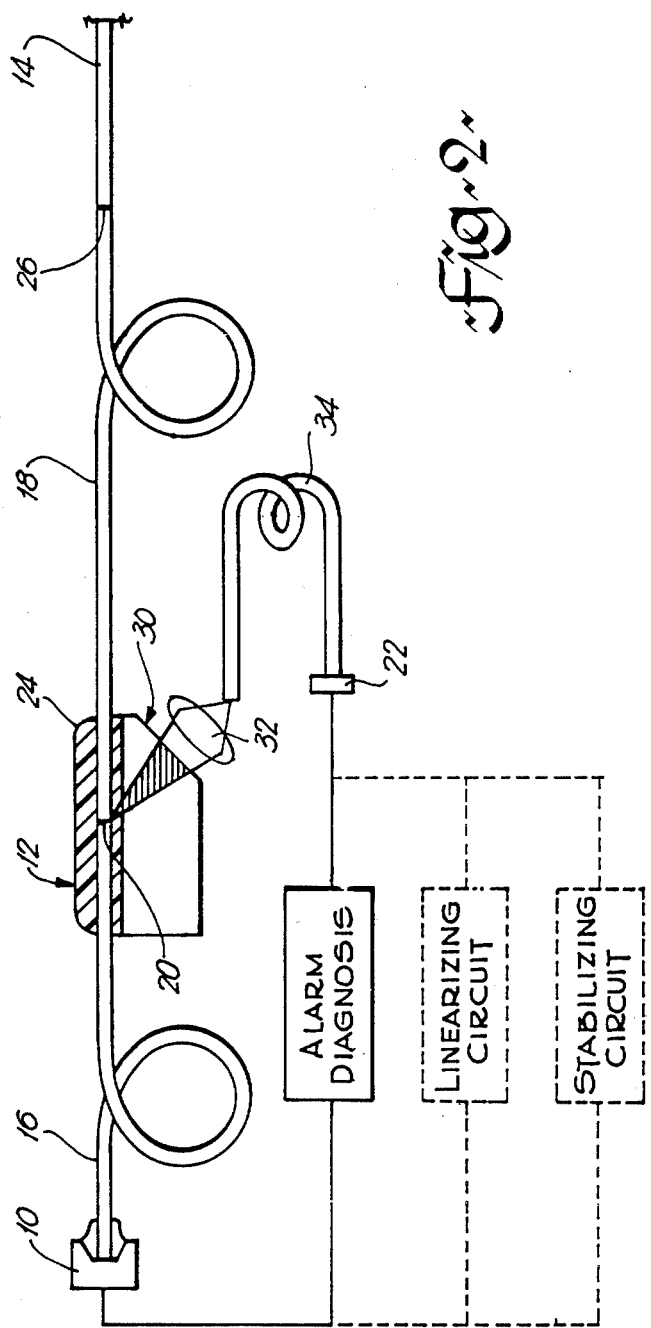

OPTICAL FIBER POWER TAP

BACKGROUND OF THE INVENTION

This invention relates to a tap for monitoring an optical signal in a fiber. The tap finds particular application for monitoring the output power of optical transmitters.

Optical fiber waveguide transmitters are often required to be equipped with a transmitted power monitor. The most common application of such a monitor is that of alarm diagnosis in the event of optical source failure. Other applications include the stabilization of output power and feedback linearization.

Basically, in a fiberoptic monitoring tap, a predetermined fraction of light from an optical fiber is diverted from the fiber and directed to a photodetector where its power level is measured.

A known fiberoptic tap is made by twisting together two lengths of optical fiber, heating the twisted pair in a twist region, and pulling the twisted pair from either end to encourage fusion at the heated region. The resulting component has four ports. Typically, when monitoring transmitter power, one port is coupled to the optical source, a second port is spliced to the output fiber, a third port is redundant and so is placed in a reservoir of index-matched oil, and from the last port is taken the monitored light signal from which the transmitted output power can be calculated.

Like other known taps, this power tap incurs a penalty in the form of reduction of transmitted power. Some power is diverted to the monitor photodetector and some is lost by device coupling imperfections.

SUMMARY OF THE INVENTION

A fiberoptic tap is now proposed in which the principle of conservation of radiance is used and which, when practically embodied as a transmitter power monitor, draws only optical power which is superfluous to that which can be transmitted into the output fiber.

According to the invention there is provided an optical fiber tap comprising first and second optical fibers, the first fiber having a higher mode volume than the second fiber whereby one end of the second fiber located to receive light emitted from one end of the first fiber receives only a fraction of the emitted light, and means for directing to a photodetector light radiated from the first fiber end other than said fraction directed into the second fiber.

The first and second fibers can be spliced together. Preferably a large area photodiode is located close to a junction region between the spliced fiber ends so as to receive light radiated from the junction region. The photodiode can be maintained in position by a mass of transparent adhesive surrounding the junction region, such mass acting to transmit radiated light towards the photodiode.

The photodetector can alternatively be maintained at a remote location. In such an embodiment, a transparent prism can be sealed into a mass of transparent adhesive adjacent the junction region so that light transmitted to the transparent block is directed predominantly from one face of the prism. The photodetector can be located adjacent to the prism face or can be located at the end of monitoring optics coupled to the emitting face.

In most practical fiberoptic installations, output or line fibers are of the graded index type, such fiber being characterized by a relatively lower mode volume in comparison to a step-index fiber of equivalent core size. Thus for coupling light from a light emitting source to a graded index output fiber, the first fiber of the tap can be a pigtail of step-index fiber with the second fiber being a pigtail of graded index fiber which cannot support all of the modes generated in the step-index fiber. However, the only requirement of the tap is that some modes transmitted through the first fiber should not be supportable in the second fiber. Consequently, so long as the mode volumes differ appropriately, the transition can be step-index to step-index or graded index to graded index.

Embodiments of the invention will now be described by way of example, with reference to the accompanying drawings in which:

BRIEF DESCRIPTION OF THE DRAWING

FIG. 1 show a fiberoptic tap according to the invention, the tap incorporating a large area photodiode; and FIG. 2 shows an alternative embodiment of fiberoptic tap for use with a remote photodetector.

DETAILED DESCRIPTION

Referring in detail to FIG. 1, there is shown a light emitting diode 10, a fiberoptic tap 12, and a line fiber 14. The power tap has two pigtail fibers 16 and 18 of substantially identical core area, the fibers being spliced together, for example by the well-known fusion splicing technique. Immediately adjacent to a splice zone 20 is a large area photodiode 22 of a type available from SILONEX under the model number NSL 703, the spliced fiber being fixed in position adjacent the photodiode 22 by a mass 24 of adhesive. A suitable adhesive is made by Norland under the model No. NOA 61. The adhesive is not brittle and flows easily so producing a very smooth surface when it cures. The pigtail fiber 16 is a relatively high mode volume step-index fiber, the mode volume basically being a measure of the maximum light which the fiber can carry, this being a function both of the fiber numerical aperture and the core diameter. The fiber 18 has a lower mode volume owing to its graded index core. The light emitting diode 10 has an emitting diameter equal to or greater to the core diameter of the pigtail fiber 16 to which it is coupled. This ensures that the step-index pigtail fiber 16 is fully excited. In particular it supports modes which cannot be supported in the other pigtail fiber 18. Power transmitted across the splice zone 20 is only 50% of the power transmitted by fiber 16 because of the difference in refractive index profiles of the two fibers.

Most important from a practical viewpoint however, is the fact that the pigtail fiber 18 carries no less power than if it had been directly coupled to the light emitting diode 10. The rejected power is radiated away from the splice zone 20. Upwardly directed light is reflected at the surface of the adhesive mass 24 and together with directly radiated light, passes through a thin layer of the adhesive and impinges on the adjacent photodiode 22. The photodiode 22 can be connected into a diagnostic alarm circuit, a linearization circuit or a stabilizing circuit all being well known in the optical transmitter control art. The pigtail fiber 18 should itself have a mode volume marginally larger than the line fiber 14 so that even if light is lost at splice or connector imperfections, the line fiber transmits the maximum optical power of which it is capable.

The power tap described possesses several advantageous features compared to known power taps. Firstly, it taps off a large proportion of power, 50% in the example of FIG. 1, without lessening the power that would, in any practical embodiment, be launched into the graded index line fiber. Secondly, since the power tap is essentially a standard splice, the insertion loss is minimal, and both size and cost are modest. Thirdly, power detected is very closely correlated with the transmitter power. Finally, so long as modes are excited throughout the area of the first fiber core, the tap ratio is determined largely by the respective mode volumes of the fibers 16 and 18, the mode volume being a standard parameter of commercially available fiber. The tap ratio is not closely dependent upon assembly tolerances. It should be mentioned that although LED's will normally excite modes throughout the first fiber core, semiconductor lasers often will not. In the latter case, though the tap is quite adequate as a message tap, it will have a less predictable power tap ratio.

Referring to FIG. 2, there is shown an example of power tap in which the photodetector is located remote from the power tap splice. Features equivalent to those appearing in the FIG. 1 embodiment are designated by like numerals. The FIG. 2 optical power tap has a transparent block of glass adhering to the fibers in the position occupied by the photodiode in the FIG. 1 embodiment. The block has an inclined plane face 30. The angle of the face is chosen to be roughly perpendicular to the direction in which optical radiation (shaded) is emitted from the splice zone 20. The light is concentrated at a lens system 32 to the input end of a supplementary fiber 34 whence it is taken to a monitoring photodetector.

The examples of tap shown are for a specific use as power taps. The invention can also be used in, for example, a series of message taps in which a certain amount of light is drawn off at each tap. In such an embodiment, at each tap a short length of relatively lower mode volume fiber will be inserted between and spliced to contiguous length of a line fiber. The arrangement obtained can be used as a tap for optical signals propagating in both directions along the fiber since two unidirectional tap regions are provided.

In the embodiments shown, the function of the adhesive 24 is manifold. Thus, the region of adhesive below the splice zone 20 in the FIGS. 1 and 2 embodiments acts to couple light out of the cladding of pigtail fiber 18 to transmit it to a photodiode or transparent block as appropriate. Next, the top surface of the adhesive acts to supplement the downward directed light by reflecting upwardly radiating light from its top surface. Additionally the adhesive has a protection function. Lastly, the adhesive acts to support the photodiode or the transparent block in the desired position adjacent the splice zone 20. Obviously, although not particularly convenient from a practical viewpoint, these three functions can be performed by two or three components instead of jointly by the adhesive 24. Additionally, there is no reason, in principle, why the photodiode cannot be fabricated directly on the fiber in the splice zone.

What is claimed is:

1. A fiberoptic tap comprising first and second optical fibers having a core and a cladding, the cores of the first and second fibers being of substantially identical diameter, the first fiber having a higher mode volume than the second fiber, one end of the second fiber being positioned adjacent to and aligned with one end of the first fiber for receiving light emitted from the first fiber in a number of predetermined modes, and a photodetector mounted to receive light emitted from said first fiber in modes other than said predetermined modes received by the second fiber.

2. A fiberoptic tap as claimed in claim 1, in which the first and second fibers are spliced together.

3. A fiberoptic tap as claimed in claim 1, in which the first fiber is a step-index fiber and the second fiber is a graded index fiber.

4. A fiberoptic tap as claimed in claim 1, in which the photodetector includes a large area photodiode located adjacent a junction region between the ends of the first and the second fibers.

5. A fiberoptic tap as claimed in claim 1, in which a reflector is located to direct to the photodetector light radiated from a junction zone between the fiber ends.

6. A fiberoptic tap as claimed in claim 1, in which a mass of clear adhesive extends between a junction zone between the fiber ends and the photodetector whereby to couple light from said junction zone to the photodetector.

7. A fiberoptic tap as claimed in claim 6, in which the mass of adhesive surrounds the junction zone.

8. A fiberoptic tap as claimed in claim 1, further comprising a transparent block mounted adjacent to a junction zone between the fibers, the block shaped to direct said radiated light predominantly from one face thereof.

9. A fiberoptic tap as claimed in claim 8, in which a third fiber couples light from said one face of the block to the photodetector.

10. A fiberoptic link comprising:
   an optical source for generating light in a large number of modes
   a fiberoptic tap consisting of first and second optical fibers having a core and a cladding, the cores of the first and second fibers being of substantially identical diameter, the second fiber having a lower mode volume than the first fiber and than the number of modes generated by the optical source, one end of the first fiber being positioned to receive light generated by the optical source, one end of the second fiber being positioned adjacent to and aligned with the other end of the first fiber for receiving light emitted from the first fiber in a number of predetermined modes, and a photodetector mounted to receive light emitted from said first fiber in modes other than said predetermined modes received by the second fiber; and
   a line fiber having a mode volume lower than or equal to the mode volume of the second fiber, joined to the other end of the second fiber whereby light from the second fiber is directed into the line fiber.

11. A fiberoptic link as claimed in claim 10, further including a control path from the photodetector to the optical source.

12. A fiberoptic link as claimed in claim 10, in which the second fiber is spliced to the line fiber.

13. A fiberoptic link as claimed in claim 12, in which the optical source is a light emitting diode, the light emitting diode having an equal or larger emitting area than the core of the first fiber.

* * * * *